(12) United States Patent
Zikeli et al.

(10) Patent No.: US 7,204,265 B2
(45) Date of Patent: Apr. 17, 2007

(54) BURSTING INSERT

(75) Inventors: Stefan Zikeli, Regau (AT); Friedrich Ecker, Timelkam (AT)

(73) Assignee: Zimmer Aktiengesellschaft, Frankfurt am Main (DE)

( * ) Notice: Subject to any disclaimer, the term of this patent is extended or adjusted under 35 U.S.C. 154(b) by 0 days.

(21) Appl. No.: 10/918,120

(22) Filed: Aug. 13, 2004

(65) Prior Publication Data

US 2005/0051210 A1    Mar. 10, 2005

Related U.S. Application Data

(63) Continuation of application No. PCT/EP02/12595, filed on Nov. 11, 2002, now abandoned.

(30) Foreign Application Priority Data

Feb. 13, 2002   (DE)   ................ 102 06 089

(51) Int. Cl.
*F16K 17/16*   (2006.01)
(52) U.S. Cl. ................ 137/68.25; 137/68.23
(58) Field of Classification Search ............ 137/68.19, 137/68.23, 68.25; 220/89.2
See application file for complete search history.

(56) References Cited

U.S. PATENT DOCUMENTS

| | | | | |
|---|---|---|---|---|
| 1,655,433 A | * | 1/1928 | Morris | 137/68.23 |
| 1,765,883 A | * | 6/1930 | Ruschke | 137/68.23 |
| 2,518,827 A | * | 8/1950 | Smith | 220/89.2 |
| 3,061,402 A | | 10/1962 | Sanders | |
| 3,404,698 A | * | 10/1968 | Rouse | 137/68.23 |
| 3,924,984 A | | 12/1975 | Giacobazzi | |
| 4,043,718 A | | 8/1977 | Takenaka et al. | |
| 4,142,913 A | | 3/1979 | McCorsley, III et al. | |
| 4,144,080 A | | 3/1979 | McCorsley, III | |
| 4,211,574 A | | 7/1980 | McCorsley, III et al. | |

(Continued)

FOREIGN PATENT DOCUMENTS

AT          395 724 B      2/1993

(Continued)

OTHER PUBLICATIONS

International Search Report for International Application No. PCT/EP03/02946 Issued on Jul. 29, 2003.

(Continued)

*Primary Examiner*—John Rivell
(74) *Attorney, Agent, or Firm*—Michael Best & Friedrich LLP

(57) ABSTRACT

The present invention relates to a bursting insert for installation in a pipeline system for transporting a fluid showing a spontaneous exothermic reaction. The bursting insert comprises a wall which surrounds—at least in part on the outside—a passage volume having the fluid flowing therethrough in a passage direction. A pressure discharge line which is sealed relative to the passage volume with a bursting body extends out of the passage volume. When a predetermined bursting pressure is exceeded, the bursting body can be transferred into a state in which the passage volume and the pressure discharge line are interconnected in fluid-conducting fashion. For an easy mounting of the bursting body, the bursting insert can be designed as a pipeline module which can be installed and dismounted repeatedly in the pipeline system for replacing the bursting body.

28 Claims, 4 Drawing Sheets

U.S. PATENT DOCUMENTS

| | | | |
|---|---|---|---|
| 4,219,040 A | 8/1980 | Fallon et al. | |
| 4,246,221 A | 1/1981 | McCorsley, III | |
| 4,261,941 A | 4/1981 | Sherman et al. | |
| 4,261,943 A | 4/1981 | McCorsley, III | |
| 4,263,929 A * | 4/1981 | Kearney | 137/68.18 |
| 4,416,698 A | 11/1983 | McCorsley, III | |
| 4,477,951 A | 10/1984 | Geyer, Jr. et al. | |
| 4,529,368 A | 7/1985 | Makansi | |
| 4,713,290 A | 12/1987 | Kwon et al. | |
| 4,869,860 A | 9/1989 | Lewis, Jr. | |
| 5,191,990 A * | 3/1993 | Fritts | 220/89.2 |
| 5,252,284 A | 10/1993 | Jurkovic et al. | |
| 5,607,639 A | 3/1997 | Zikeli et al. | |
| 5,658,524 A | 8/1997 | Portnoy et al. | |
| 5,968,434 A | 10/1999 | Zikeli et al. | |
| 5,984,655 A | 11/1999 | Schwenninger et al. | |
| 6,173,767 B1 | 1/2001 | Kennon | |
| 6,706,224 B2 | 3/2004 | Firgo et al. | |
| 2005/0035487 A1 | 2/2005 | Zikeli et al. | |
| 2005/0048151 A1 | 3/2005 | Zikeli et al. | |
| 2005/0220916 A1 | 10/2005 | Zikeli et al. | |
| 2006/0055078 A1 | 3/2006 | Zikeli et al. | |
| 2006/0083918 A1 | 4/2006 | Zikeli et al. | |
| 2006/0144062 A1 | 7/2006 | Zikeli et al. | |

FOREIGN PATENT DOCUMENTS

| | | |
|---|---|---|
| DE | 218 121 | 7/1908 |
| DE | 858 005 | 12/1952 |
| DE | 2 014 828 | 10/1970 |
| DE | 20 14 828 | 10/1970 |
| DE | 2732012 | 1/1978 |
| DE | 36 11 947 | 10/1987 |
| DE | 42 19 658 | 12/1993 |
| DE | 4306925 | 9/1994 |
| DE | 4 309 416 | 10/1994 |
| DE | 43 12 219 | 10/1994 |
| DE | 44 09 609 | 10/1994 |
| DE | 44 19 441 | 12/1995 |
| DE | 44 26 966 | 2/1996 |
| DE | 44 19 440 | 6/1996 |
| DE | 295 04 127 U | 7/1996 |
| DE | 19504316 | 8/1996 |
| DE | 195 11 151 | 10/1996 |
| DE | 197 53 806 | 6/1998 |
| DE | 19 717 257 | 10/1998 |
| DE | 197 21 609 | 11/1998 |
| DE | 69425098 | 7/2000 |
| DE | 19 915 235 | 10/2000 |
| DE | 19924508 | 11/2000 |
| DE | 10 037 923 | 3/2001 |
| DE | 100 23 391 | 3/2001 |
| DE | 100 16 307 | 10/2001 |
| DE | 100 19 660 | 11/2001 |
| DE | 100 60 877 | 7/2002 |
| DE | 100 60 879 | 7/2002 |
| DE | 10 200 405 | 8/2002 |
| DE | 102 06 089 | 8/2002 |
| DE | 102 23 268 | 1/2003 |
| DE | 10 200 406 | 7/2003 |
| DE | 10 204 381 | 8/2003 |
| DE | 103 14 878 | 10/2004 |
| EP | 0 172 001 | 2/1986 |
| EP | 0 494 851 | 7/1992 |
| EP | 0 626 198 | 11/1994 |
| EP | 0641877 | 3/1995 |
| EP | 0 662 204 | 7/1995 |
| EP | 0 662 264 | 7/1995 |
| EP | 0 789 822 | 8/1997 |
| EP | 0 853 146 | 7/1998 |
| GB | 1311146 | 3/1973 |
| GB | 2 007 147 | 5/1979 |
| GB | 1 583 265 | 1/1981 |
| JP | 59-228012 | 12/1984 |
| JP | 64-52809 | 2/1989 |
| JP | 03-076822 | 4/1991 |
| WO | WO 93/19230 | 9/1993 |
| WO | WO 94/08162 | 4/1994 |
| WO | 94/20656 | 9/1994 |
| WO | WO 94/18983 | 9/1994 |
| WO | WO 94/28218 | 12/1994 |
| WO | WO 95/01470 | 1/1995 |
| WO | WO 95/01473 | 1/1995 |
| WO | WO 95/04173 | 2/1995 |
| WO | WO 95/05173 | 2/1995 |
| WO | WO 96/07777 | 3/1996 |
| WO | 96/18760 | 6/1996 |
| WO | WO 96/17118 | 6/1996 |
| WO | WO 96/20300 | 7/1996 |
| WO | WO 96/21758 | 7/1996 |
| WO | WO 96/30566 | 10/1996 |
| WO | 97/33020 | 9/1997 |
| WO | WO 98/18983 | 5/1998 |
| WO | WO 98/19230 | 5/1998 |
| WO | WO 98/28218 | 7/1998 |
| WO | WO 99/00185 | 1/1999 |
| WO | WO 00/06813 | 2/2000 |
| WO | 01/58960 | 8/2001 |
| WO | WO 01/68958 | 9/2001 |
| WO | 01/74906 | 10/2001 |
| WO | 03/057951 | 7/2003 |
| WO | 03/057952 | 7/2003 |
| WO | 03/064735 | 8/2003 |
| WO | 03/080906 | 10/2003 |
| WO | 03/100140 | 12/2003 |
| WO | 2004/088010 | 10/2004 |

OTHER PUBLICATIONS

Taschenbuch für Heizung- und Klimatechnik 68, Auflage 1997/1998, Recknagel-Sprenger-Schramek, ISBN 3-486-26214-9, pp. 1073, 1074, 1247, 1248, 1438, 1613, 1614.

* cited by examiner

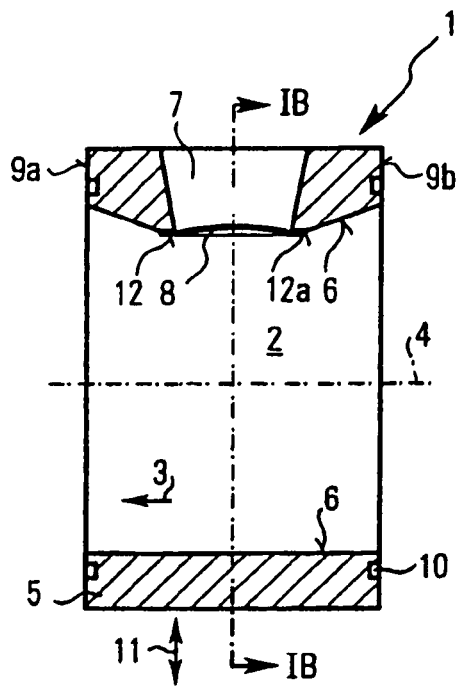
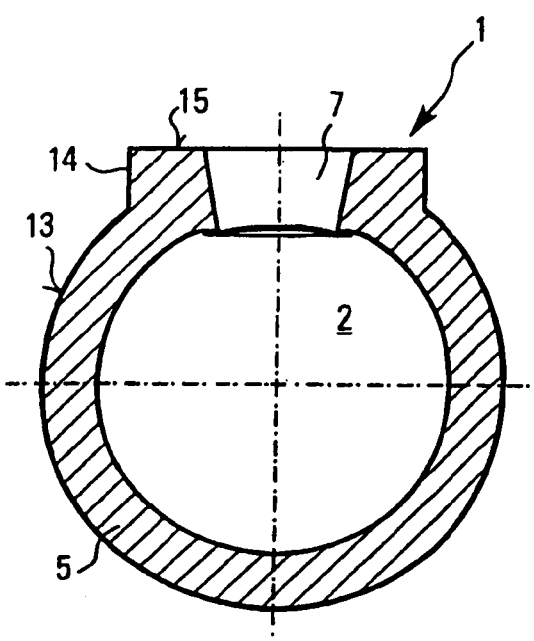
FIG.1A  FIG.1B
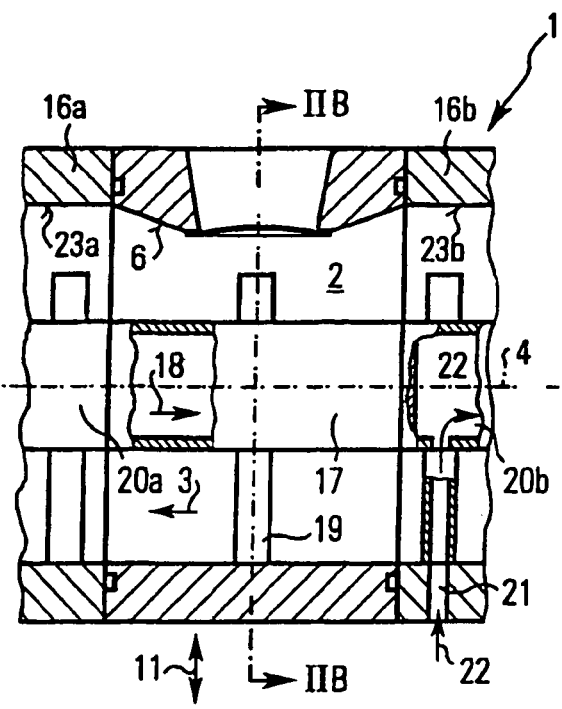
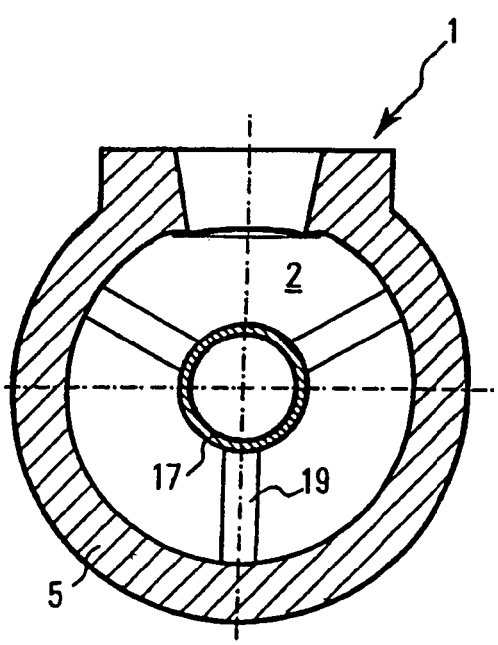
FIG.2A  FIG.2B

BURSTING INSERT

This is a Continuation of International Application PCT/EP02/12595, with an international filing date of Nov., 11, 2002, now abandoned.

FIELD OF THE INVENTION

The present invention relates to bursting devices designed to be installable in a pipeline or apparatus system for transporting a fluid showing a spontaneous exothermic reaction, for instance a synthetic polymer or a polymer solution, a cellulose derivative or a solution consisting of cellulose, water and amine oxide, as well as mixtures thereof, comprising a wall which surrounds, at least in part on the outside, a passage volume having the fluid flowing therethrough in a passage direction, a pressure discharge line extending out of the passage volume, and a bursting body which seals the pressure discharge line relative to the passage volume and which, when a predetermined burst pressure is exceeded, is transferable into a state in which the passage volume and the pressure discharge line are interconnected in fluid-conducting fashion.

BACKGROUND OF THE INVENTION

Pipeline and apparatus systems having pressure relief devices are conventionally used in spinning and extrusion systems in which the fluid forms the molding material to be spun. The fluid is normally transported through the pipeline system from a reaction tank, in which it is mixed from its individual constituents, to a spinneret or extrusion device by which it is molded into molded bodies, e.g. by being spun or extruded. In general, the pipeline systems include further apparatus such as pumps, pressure compensating tanks, sieve systems, or heating devices.

The fluids used in spinning facilities are heat-sensitive and tend to carry out a spontaneous exothermic reaction whenever a specific maximum temperature is exceeded in the fluid line member. An exothermic reaction might also take place below the maximum temperature when the fluid is stored for an excessively long period of time, which is e.g. often the case with dead water zones.

As a fluid particularly suited for the above-mentioned bursting insert, a molding material is used that can be spun, in particular, a spinning solution containing cellulose, water and a tertiary amine oxide, such as N-methylmorpholine N-oxide (NMMO), and stabilizers for the thermal stabilization of the cellulose and the solvent and, optionally, further additives, such as titanium dioxide, barium sulfate, graphite, carboxymethyl celluloses, polyethylene glycols, chitin, chitosan, alginic acid, polysaccharides, dyes, antibacterially acting chemicals, flameproofing agents containing phosphorus, halogens or nitrogen, activated carbon, carbon blacks or electrically conductive carbon blacks, silicic acid, organic solvents as diluents, etc. A high reaction pressure is created during a spontaneous exothermic reaction in the fluid, said pressure possibly damaging the spinning facility, in particular, pumps, fluid line members, heat exchangers, or pressure compensating tanks.

Therefore, it is known in the prior art to provide burst protection devices in the pipeline system for the case of a spontaneous exothermic reaction, said devices having the function to reduce the reaction pressure as fast as possible, thereby avoiding further damage on expensive equipment caused by the reaction pressure.

For instance, the burst protection devices of EP 0 626 198 A1, WO 94/08162 and WO 99/00185 are provided with a pressure discharge line which is closed during standard operation. Whenever a predetermined burst pressure is exceeded, which is most of the time smaller than the reaction pressure created during a spontaneous exothermic reaction, the burst protection device assumes a state in which the pressure discharge line is connected to the passage volume of the pipeline system for the fluid. Due to the volume which is now additionally available in case of bursting and thanks to the pressure discharge line, respectively, the reaction pressure in the line system can be reduced and damage to expensive equipment can be avoided.

A system having the initially mentioned features is known from EP 0 662 204 B1. The pipe described therein is provided with an over-pressure relief device the surface of which is, however, mounted in a branch. The surface of the over-pressure relief device which is shiftable under pressure is substantially flush with the inside of the wall of the pipe to avoid any deposits of the fluid on the surface. The over-pressure relief device of EP 0 662 204 B1 is designed as a bursting disc which is mounted at one end of an insert installed in the branch. The branch itself is formed by the wall of the pipeline system.

However, the apparatus of EP 0 662 204 B1 has the drawback that it is complicated to replace the bursting disc. In the apparatus of EP 0 662 204, the pressure discharge line adjacent to the bursting device must be disassembled during exchange of the bursting disc. To make the bursting disc end flush with the inner wall, an exact and complicated manufacture of the bursting disc and of the insert with exact tolerances is needed. For instance, the length of the insert in the mounted state of the bursting disc must allow for an alignment of the bursting disc with the inner wall. Moreover, the insert must be sealingly mounted in the branch.

A further drawback of the apparatus of EP 0 662 204 B1 is that there is only a very limited access to the interior of the pipe, for instance, for inspection or cleaning purposes. Finally, a further drawback of the apparatus of EP 0 662 204 B1 is that part of the wall surface of the pipe can no longer be heated due to the branch and the bursting disc. This poses problems especially when particularly large bursting discs and/or branches with a large diameter must be used because of a great distance between the individual bursting disks in the passage direction of the fluid through the pipe.

The last-mentioned drawback of the apparatus of EP 0 662 204 B1 is overcome by the development according to EP 0 789 822 B1. In the apparatus of EP 0 789 822 B1, a predetermined breaking point which will rupture when the over-pressure is reached in a pipeline is provided in the interior of the pipeline and is not part of the internal wall. It is the objective of this apparatus to permit the use of bursting discs that are as small as possible and require a minimum wall surface of the pipe wall and that do not affect, if possible, the heating of the material, which is transported through the pipeline, by the wall. A further feature of the apparatus of EP 0 789 822 B1 is that the bursting disc is definitely not positioned in the direction of flow.

However, the apparatus of EP 0 789 822 B1 still is disadvantageous in that the design is very complex. Moreover, the pressure must be discharged from the predetermined breaking point in the interior of the flow through the inner wall through a pipe projecting into the fluid. Even if the pipe projects into the flow only to a slight degree, the pipe for pressure discharge forms a flow obstacle which particularly in the case of the normally highly viscous fluids may lead to dead water zones and clogging and thus to spontaneous exothermic reactions. Moreover, an inspection of the interior of the pipe is rendered difficult because of the small diameter of the bursting disc.

SUMMARY OF THE INVENTION

In the light of these drawbacks it is an object of the invention to improve the above-mentioned bursting insert such that an inspection of the interior of the pipe at the place of the bursting insert is possible with simple design means.

According to the invention said object is achieved for a bursting insert of the above-mentioned type in that the bursting insert is designed as a pipeline module which can be repeatedly installed and disassembled in the pipeline system for exchanging the bursting body.

In contrast to the solutions pursued in the prior art, the constructionally simple solution according to the invention aims at providing a bursting insert which can rapidly be exchanged or installed and dismounted, respectively, and which can be removed as a module from the pipeline system together with at least part of the wall and the bursting body. At the place where the bursting insert is dismounted together with the wall surrounding the passage volume, the interior of the pipeline system can be inspected easily.

Moreover, an exchange of the bursting body outside the pipeline is possible with the solution according to the invention. As a result, bursting bodies of a complex shape can also be used by taking simple measures, such as welding or soldering.

To keep the bursting insert simple from a constructional point of view, the pressure discharge line can in particular be designed as an opening substantially formed in the wall. This design permits a particularly simple closing of the pressure discharge line.

Thanks to the design of the bursting insert as a pipeline module which can be installed and dismounted repeatedly for exchanging the bursting body, it is possible according to a particularly advantageous design to fasten the bursting body from the inside on the wall of the passage volume. Such a design is e.g. not possible in the devices of EP 0 662 204 B1 and EP 0 789 822 B1 because, there, the interior of the pipe is only accessible through the pressure discharge line as the pipeline system always remains stationary. Hence, in the conventional devices no bursting bodies can be introduced into the pipeline system that are greater than the pressure discharge line.

A particularly exact positioning of the bursting body with high quality standards is possible by mounting the bursting body from the interior on the wall of the passage volume and due to the possibility of mounting the bursting body in the dismantled state of the bursting insert. The bursting pressure can thus be observed exactly.

The bursting body can in particular be secured directly to the wall in an area of the wall that surrounds the pressure discharge line and need not be mounted in the branch via complex inserts as is the case with the device of EP 0 662 204 B1. This advantageous measure, too, results in a more exact fastening of the bursting body which can thus observe the bursting pressure more exactly.

Since the bursting insert or the bursting module can be disassembled, the basic surface of the bursting body can be larger than the flow cross-section of the pressure discharge line. In this development the pressure in the pipeline system acts on the bursting body such that said body is pressed against the wall and can securely be held on the wall without any special and complicated fastening measures. Thanks to the direct fastening of the bursting body to the wall, the dead space zones and gaps existing in the prior art between the outer diameter of the bursting insert and the inner diameter of the pipe branch are omitted altogether.

The bursting body can in particular be designed as a bursting disc which is either planar or curved. In a curved bursting disc it is of advantage when the curvature is bent towards the pressure discharge line because the bursting pressure can thereby be observed more accurately and the stress distribution within the bursting disc is improved.

To avoid dead water zones, the bursting body can be substantially in alignment with the wall at least sectionwise and/or form part of the wall defining the passage volume.

To facilitate the assembly of the bursting body, e.g. by welding, soldering or bonding, but also by screwing, the wall in the area of the opening may form, according to an advantageous development, a shoulder or stud which projects into the fluid and on which the bursting disc is mounted.

In particular, the shoulder may form a substantially planar support surface for the bursting body, which once more simplifies the assembly and geometry of the bursting bodies.

To avoid deposits in the area of the bursting insert, the flow cross-section of the passage volume may be reduced according to a further advantageous development in the area of the bursting disc. In particular upon use of a shoulder for the mounting of the bursting body, the flow cross-section in the bursting insert can decrease towards the shoulder continuously in a way such as to enhance the flow conditions.

Because of the decreasing cross-section of the flow, the fluid is accelerated, so that possible agglomerations on the wall are entrained. As a consequence, even in cases where the bursting disc is not arranged in alignment with the wall, this measure is able to prevent clogging of the fluid due to the increased flow velocity.

To avoid problems during heating of the fluid, as may be caused by the preferably non-heated bursting body on the wall, a central body may be provided in the area of the center flow of the fluid in the passage volume for replacing the center flow of the fluid. This central body can be used for heating the fluid or also only for reducing the flow cross-section in the area of the bursting disc to prevent deposits.

In particular when the central body is used as an additional heating system, the central body can be designed as a fluid line system through which a second fluid, e.g. a heating fluid with a predetermined and/or controllable temperature, can be passed in a way where it is separated from the first fluid. Preferably, such a passing takes place in counterflow fashion, i.e. in a direction opposite to the flow through the pipeline system.

It is also of particular advantage when the bursting insert can be handled easily for replacing the bursting body. An easy handling is in particular possible when the dimensions and the weight of the bursting insert are as small as possible. This can in particular be achieved in that the length of the bursting insert in the direction of passage is smaller than the diameter of the passage volume. Hence, the bursting insert which is designed as a bursting module can substantially be designed in the manner of a flange or disc. For instance, the length of the bursting insert in the direction of passage can be three times the diameter of the bursting body or the pressure discharge line at the most.

The bursting insert of the invention need not extend over the whole cross-section of the passage volume, but can be made dividable in a plane extending transverse to the passage direction, i.e., it can comprise only part of the wall of the passage volume. In this advantageous development, when the bursting insert is dismounted, only part of the pipe wall, e.g. only the upper half of the bursting insert or the upper half of a section of the pipeline system, has to be removed for renewing a bursting body. It is however essential that part of the passage volume wall surrounding the pressure discharge line is made replaceable as well, so that the bursting body can be mounted from the inside or the bursting bodies with larger dimensions than the light diameter of the pressure discharge line can be used, respectively.

For instance, the bursting insert can be designed as a pipe section which only surrounds part of the passage volume of a pipeline member of the pipeline system and can be put on the pipeline member in a direction transverse to the passage direction on the pipeline member.

Finally, the invention also comprises a modular pipeline system which comprises at least a pipeline member and a bursting insert according to one of the above developments.

In such a modular pipeline system it is of advantage when the passage volumes of the at least one pipeline member and the bursting insert and the walls assigned to said passage volumes pass into one another substantially smoothly and continuously in the assembled state, so that there are no edges created. Dead spaces and thus the clogging created there can thereby be avoided.

The pipeline system may further be provided with a central body which is continued in the area of the bursting insert and which is either part of the bursting insert or which is surrounded at least sectionwise by the wall of the bursting insert.

For extending the modular pipeline system in an easy way the at least one pipeline member and the bursting insert may be provided with matching flanges at their ends situated in the passage direction. The advantage of this design is that the pipeline members and bursting inserts can be combined with one another in any desired way and can be adapted to the corresponding needs of the system.

In a spontaneous exothermic reaction, waste products are formed that may be solid, liquid or gaseous. Said waste products are discharged to the outside through the pressure discharge line in case of bursting. In this context it is of advantage when, in a further development, said waste products are supplied to further systems which are connected to the pressure discharge line and which purify the fluid passing through the pressure discharge line and separate the waste products from the fluid. In particular, a gas purifying system may also be connected to the pressure discharge line.

The solid, liquid or gaseous substances created in case of bursting can be supplied to waste or purifying systems, in particular also gas purifying systems.

The structure and function of a bursting insert according to the invention shall now be explained by way of example with reference to embodiments taken in conjunction with the drawings. As is clearly evident to one skilled in the art, the features of the individual embodiments can be combined in any desired way.

BRIEF DESCRIPTION OF THE DRAWINGS

FIG. 1A shows a first embodiment of a bursting insert according to the invention, in a longitudinal section;

FIG. 1B is a view of the bursting insert of FIG. 1A taken along line IB—IB of FIG. 1A;

FIG. 2A shows a second embodiment of a bursting insert according to the invention, in a longitudinal section;

FIG. 2B shows the bursting insert of FIG. 2A in a section taken along line IIB—IIB;

DETAILED DESCRIPTION

Figure 3A:
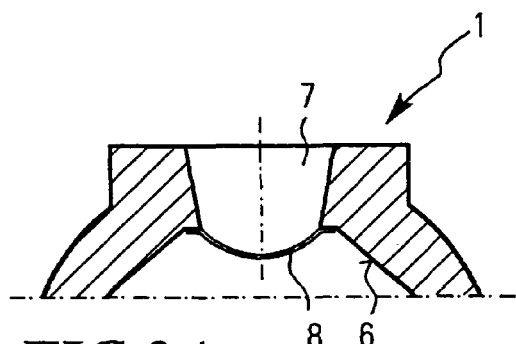
FIG. 3A shows a first variant of mounting a bursting body on a bursting insert according to the invention.

First of all, the structure of a bursting insert according to the invention shall be explained by way of example with reference to the embodiment of FIG. 1A.

According to FIG. 1A a bursting insert 1 of the invention, which can also be designated as a bursting module because of its modular structure, has a passage volume 2 having a fluid (no reference numeral) flowing therethrough in a flow direction 3, essentially along a center axis 4. The passage volume 2 extends through the whole pipeline system (not shown in FIG. 1A) and is defined in the area of the bursting insert 1 by a wall 5 having an inner surface 6 oriented towards the passage volume 2.

In the wall, a pressure discharge line 7, which is designed as an opening in the wall, is provided, the discharge means 7 leading away from the passage volume 2 and being closed in pressure-tight fashion with respect to the passage volume 2 by a bursting body 8. The pressure discharge line 7 may have a round cross-section. At the ends situated in flow direction 3, the bursting insert 1 comprises stop surfaces 9a, 9b which can be brought into sealing engagement with corresponding mating surfaces of the pipeline system (not shown). The stop surfaces may have centering surfaces and be provided with a seal receiving means 10. In the area of the stop surfaces, flanges (not shown in FIG. 1A) may be provided that correspond to the flanges used as a standard in the pipeline system (DIN, ASME, etc.), so that the bursting insert can be installed in modular fashion at any point of the pipeline system.

The stop surfaces 9a, 9b and the seal of the sealing surfaces 10 are designed such that the bursting insert 1 can be removed in a direction transverse to the passage direction 3 and the center axis 4, respectively, as outlined by the double-headed arrow 11, without the need for modifying anything on the pipeline system.

As can be seen in FIG. 1A, the bursting body 8 is mounted, resting on a substantially planar support surface 12, on the inner surface 6 of the wall 5 from the inside. The bursting body 8 may be connected to the wall 5 in interlocking or integral fashion.

The support surface 12 is essentially planar and is formed by a step or shoulder 12a which is formed by an increase in the wall thickness of wall 5 towards the support surface 12 or the pressure discharge line 7.

Due to the increase in wall thickness towards the pressure discharge line 7, the flow cross-section of the bursting insert is reduced; the flow cross-section is thus minimum in the area of the bursting body.

As can also be seen in FIG. 1A, the inner surface of the bursting body 8 facing the passage volume 2 forms part of the inner wall of the bursting insert.

The bursting body 8 of FIG. 1A is designed as a bursting disc which forms a spherical cap surface projecting into the pressure discharge line 7. The bursting body 8 is planar on the edges resting on the support 12.

FIG. 1B shows the embodiment of FIG. 1A in a section taken along line IB—IB, i.e. in the center plane in a direction transverse to the passage direction 3.

As can be seen in FIG. 1B, the bursting insert 1 forms a substantially hollow cylindrical pipe section whose length in the passage direction 3 of the fluid is smaller than the diameter of the passage volume 2. In particular, the length of the bursting insert 1 in the passage direction 3 or center direction 4 is not more than three times, preferably not more than two times, the diameter of the bursting body 8 or the pressure discharge line 7 in order to be as lightweight as possible and thus to be easily manageable.

As shown in FIG. 1B, the outer surface 13 of the wall 5 of the bursting insert 1 in the area of the pressure discharge line 7 has formed thereon a shoulder 14 which serves as an assembling aid for pipeline systems connected to the pressure discharge line 7. In case of bursting the fluid can be discharged through said line systems (not shown) and subjected to specific processing steps.

The shoulder 14 may form a substantially planar sealing surface 15. As shown in FIGS. 1A and 1B, the pressure discharge line 7 may expand to the outside.

FIG. 2A shows a second embodiment of a bursting insert or module 1 according to the invention in a mounted state between two pipeline members 16a, 16b of the pipeline system.

The same reference numerals are used for FIG. 2A and also for the further subsequent figures and embodiments, for similar or identical structural members and components of the bursting insert, as are already known from the embodiment of FIGS. 1A and 1B. For the sake of simplicity, only the differences between the embodiments shall be discussed in the description of the following embodiments.

The embodiment of FIG. 2A differs essentially from the embodiment of FIG. 1A by a central body 17 which is mounted in the passage volume 2. The central body 17 extends in passage direction 3 around the area of the center axis 4 in place of the center flow otherwise prevailing there.

The central body 17 is designed as a pipe which, separated from the fluid in the passage volume, has fluid flowing therethrough in a direction 18. As can be seen in FIG. 2A, the flow direction 18 in the central body 17 is opposite to the flow direction 3 in the pipeline system.

The fluid flowing in the central body 17 can be used for heating the fluid in passage volume 2. A mixing of the fluids in the passage volume 2 on the one hand and in the central body 17 on the other hand is ruled out.

The central body 17 is held in its center position via spacers 19 designed in an advantageous manner in terms of flow conditions. The cross section of the spacers 19 in flow direction is chosen such that no dead water zones are created downstream of the spacers 19.

As can be seen in FIG. 2A, the pipeline members 16a and 16b are also provided with central bodies 20a, 20b which follow the central body 17 of the bursting insert 1 without interruption. In particular, the central bodies 17, 20a, 20b are interconnected tightly such that a continuous pipeline is created.

In an alternative variant, the central body 17 of the bursting insert may have no fluid flowing therethrough and the central bodies 20a and 20b of the pipeline members 16a, 16b may comprise a fluid supply line 21 near the connection point with the central body 17, with heating fluid being passed through said line 21 in the direction of arrows 22 into the respective central body 20b, 20a. In this variant, the central body 17 just serves as a dummy which permits an advantageous flow transition between the central bodies 20a, 20b.

As can further be seen in FIG. 2A, the transition between the central bodies 17, 20a, 20b and between the internal walls 23a, 23b and the inner wall 6 of the bursting insert 1 is essentially smooth and without any interruption.

Finally, as can also be seen in FIG. 1A, the bursting insert 1 is designed such that it can be assembled and disassembled in the direction of the double-headed arrow 11 in a substantially unchanged state of the pipeline system.

FIG. 2B shows a view of the embodiment of FIG. 2A in a section taken along line IIB—IIB of FIG. 2A.

As can be seen in FIG. 2B, the central body 17 is designed as a pipe which extends concentric to the wall 5, which is formed as a pipe section. As can further be seen in FIG. 2B, three spacers 19 that are spaced apart from one another at the same angle are provided on the central body 17. The cross section of the spacers 19 is optimized in terms of flow conditions such that no dead-water zones appear downstream of the spacers 19.

FIG. 3A shows a first variant of a bursting body 8 of the bursting insert 1.

In contrast to the embodiment of FIGS. 1A to 2B, the bursting body 8 is just curved and not designed as a calotte. Moreover, the curvature faces away from the pressure discharge line 7.

Figure 3B:
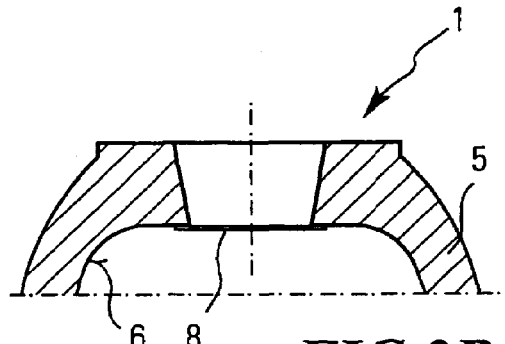
FIG. 3B shows a second variant for mounting a bursting body on a bursting insert according to the invention.

FIG. 3B shows a further variant of a bursting body 8, which is designed as a bursting disc. The bursting body 8 is designed as a substantially planar disc which is soldered on its edges to the wall 5 of the bursting insert 1.

Figure 3C:
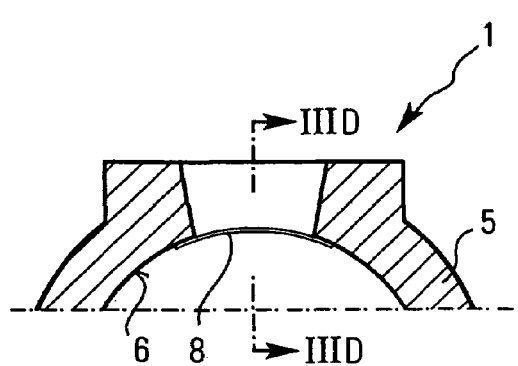
FIG. 3C shows a third variant for mounting a bursting body on a bursting insert according to the invention.
Figure 3D:
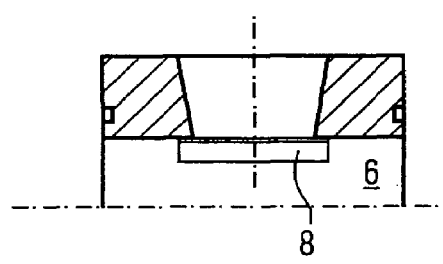
FIG. 3D shows the variant of FIGS. 3C in a section taken along line IIID—IIID.

FIG. 3C shows a third variant of a bursting disc 8 of the bursting insert 1. FIG. 3D is a view taken along line IIID—IIID of FIG. 3C.

As can be seen with reference to FIGS. 3C and 3D, the bursting disc 8 is arcuately curved as a section of a cylindrical outer surface, so that it continues the inner surface 6 of wall 5 in the area of the passage opening 7. As can in particular be seen with reference to FIG. 3D, the flow cross-section is not reduced in this variant.

In all of the variants shown in FIGS. 3A to 3D, the bursting body 8 is attached from the inside to the inner surface 6 of the wall 5, thereby forming part of the inner wall.

Figure 4:
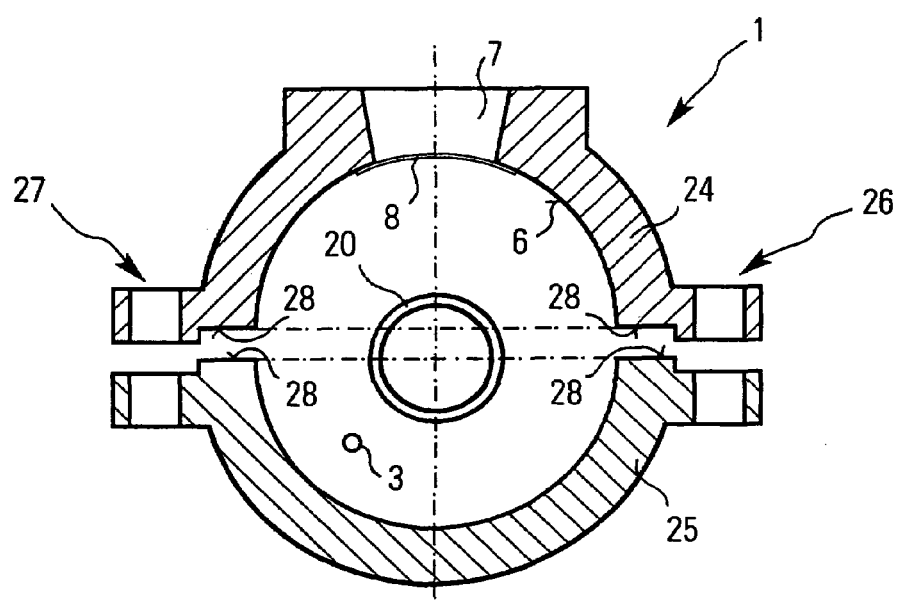
FIG. 4 shows a third embodiment of a bursting insert according to the invention.

FIG. 4 shows a third embodiment of a bursting insert according to the invention, which is divided in a plane transverse to the passage direction 3. In particular, the bursting insert 1 according to the embodiment of FIG. 4 comprises a first part 24 and a second part 25 that are held together in pressure- and fluid-tight fashion by means of two flanges 26, 27 extending in passage direction 3 at both sides of the bursting device 1. To this end the two parts 24, 25 are provided with sealing surfaces 28 at the surfaces facing each other. The second part 25 may be assigned to the pipeline system and firmly connected to the pipeline system.

The embodiment of FIG. 4 can in particular be used in cases where the two pipeline members 16a, 16b (not shown in FIG. 4) that are located at both sides of the bursting insert comprise a single continuous central body 20, which is not part of the bursting insert, around which the burst protection device 1 is located.

In the embodiment of FIG. 4, it is only the one part 24 that must be removed from the second part 25 by detachment of fastening means on the flanges 26, 27. The central body 20 of the pipeline system may here remain unchanged.

It is of advantage here that that part is made detachable on which the bursting body 8 and the pressure discharge line 7 are provided. Said design facilitates the installation of a new bursting body 8 on the inner surface 6 of the part 24 from the inside on the wall 5.

FIG. 4 shows the bursting device in a substantially diametrically divided fashion. Instead of such a diametrical division, the one part 24 may also extend over a larger or smaller angle than 180° (cf. FIG. 5).

Figure 5:
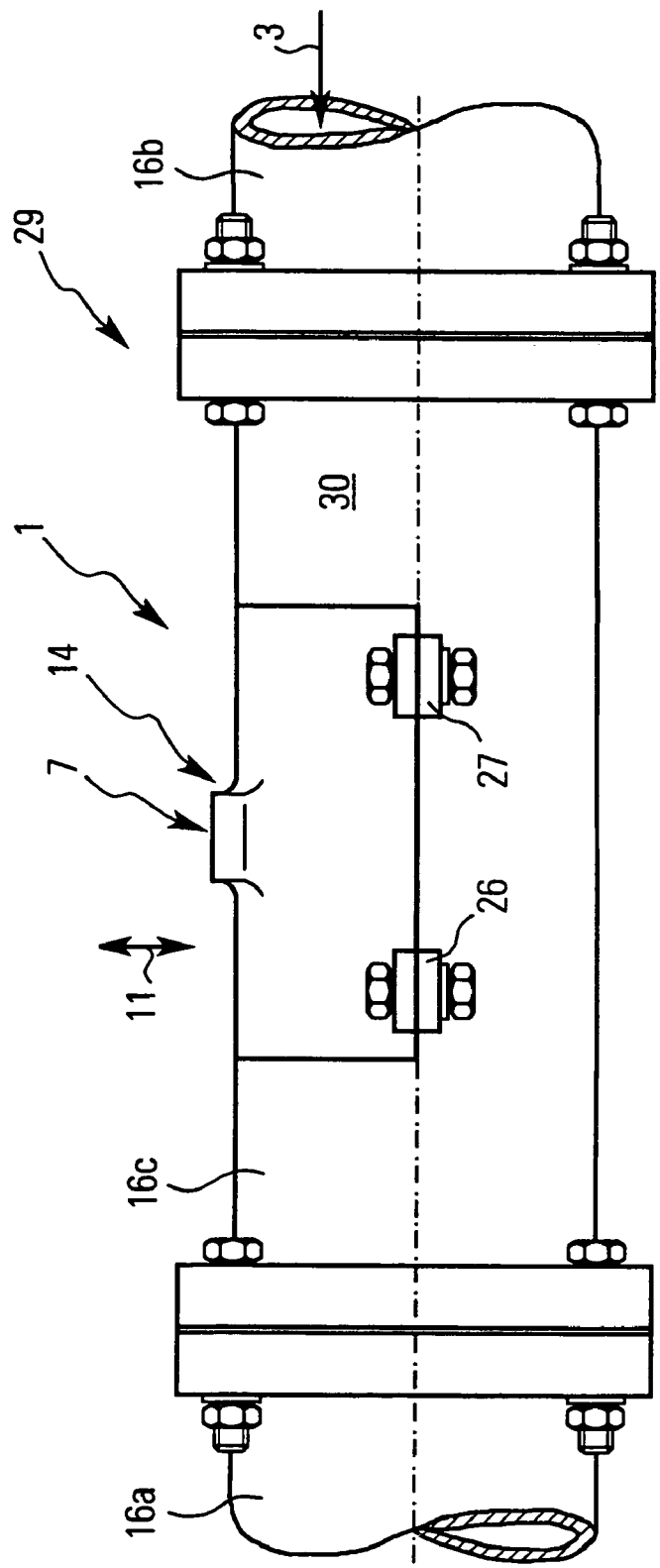
FIG. 5 shows a fourth embodiment of a bursting insert according to the invention.

FIG. 5 shows a fourth embodiment substantially similar to the embodiment of FIG. 4. FIG. 5 is an external view of a pipeline system 29 having a plurality of pipeline members 16a, 16b, 16c. The pipeline system 29 may also be designed as an apparatus system including further apparatuses (not shown in FIG. 5) that are interconnected by pipeline members. Such apparatuses for transporting the fluid include e.g. pressure compensating tanks, sieve facilities, pumps and heating devices.

In a pipeline member 16c, a bursting insert can be seen which can be installed and dismounted repeatedly via flanges 26, 27 on the pipeline member 16c in a direction transverse to the passage direction 3, in the direction of arrow 11. The pipeline member 16c is here essentially identical with part 25 of FIG. 4.

The bursting insert 1 according to the embodiment of FIG. 5 just forms part of the wall 30 of the pipeline member 16c. The pressure discharge line 7 is arranged in this removable wall section, according to the embodiment of FIG. 5 on an attachment 14.

Hence, in the embodiment of FIG. 5, a separate bursting insert arranged between two pipeline members 16a, 16b can be omitted in favor of a bursting insert mounted on an already existing pipeline member 16c.

Figure 6:
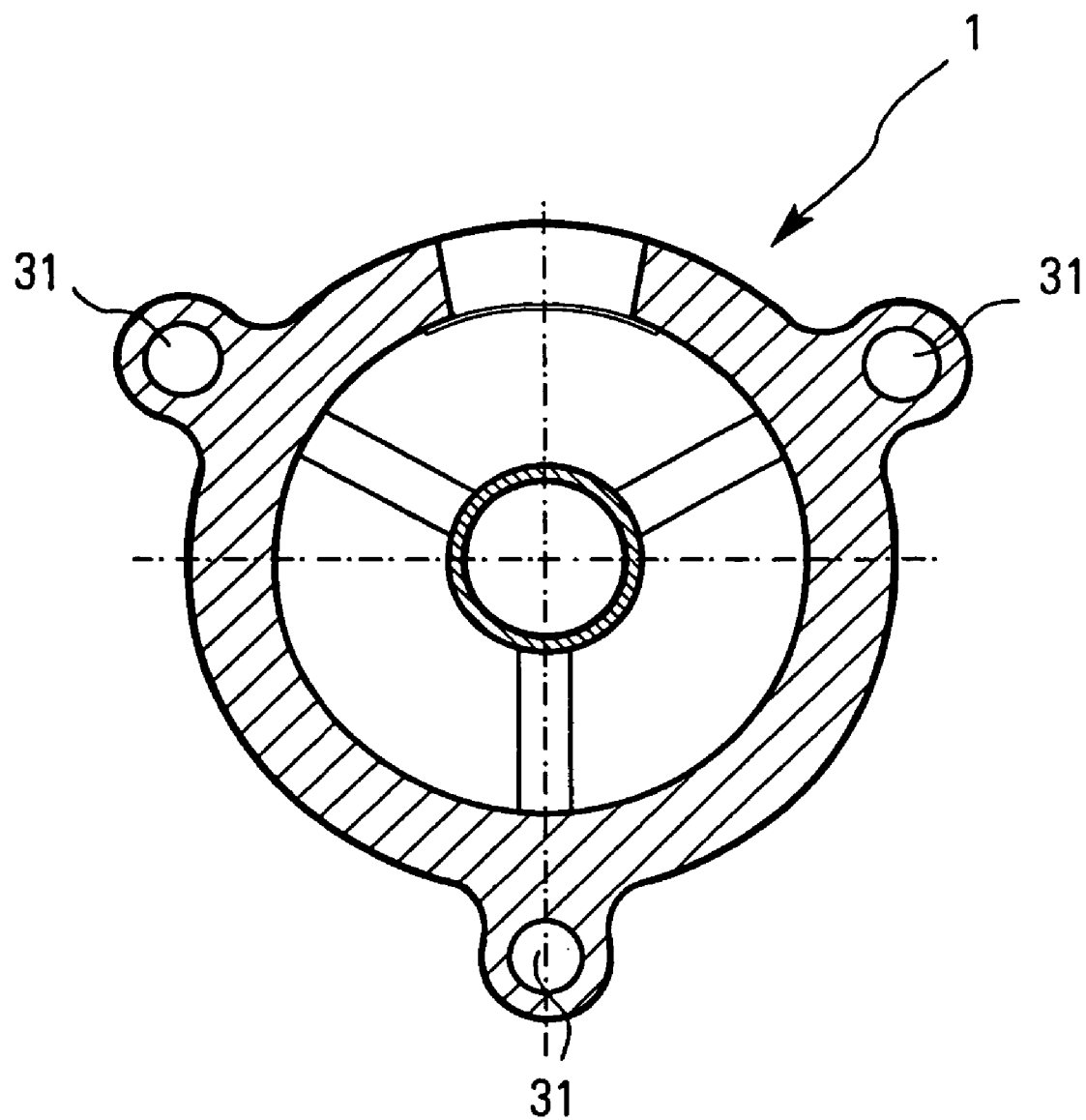
FIG. 6 shows a fifth embodiment of a bursting insert according to the invention.

Finally, FIG. 6 shows a fifth and last embodiment of a bursting insert 1 of the invention, which just differs from the previously described embodiments by a centering device 31.

To sum up, the function of the bursting insert 1 according to the invention shall briefly be discussed. The function being essentially the same in all embodiments.

The bursting insert 1 according to any one of the above-described embodiments is particularly suited for conveying fluids showing an exothermic reaction, such as synthetic polymers, cellulose derivatives or solutions consisting of cellulose, water and amine oxide. In particular, the bursting insert 1 according to the invention is suited for spinning solutions containing cellulose, water and tertiary amine oxide, use being preferably made of N-methylmorpholine N-oxide as the amine oxide. Furthermore, stabilizers and further additives, as have already been described at the outset, may be used.

Such fluids tend to perform a spontaneous exothermic reaction, whereby the pressure rises in the interior of the pipeline system 29. To avoid damage to equipment connected to the pipeline system 29, such as pumps, spinnerets, pressure compensating tanks, etc., bursting inserts 1 are provided at periodic intervals in the pipeline system 29. The bursting bodies 8 are here conceived such that they deform or break when a specific reaction pressure in the passage volume 2, the bursting pressure, is exceeded, and that they connect the pressure discharge line 7 to the passage volume 2. The reaction pressure can thus be discharged through the pressure discharge line 7 under favorable flow conditions.

In an exothermic reaction of the fluid, reaction products are created that may be solid, liquid or gaseous. Said reaction products are waste products that are flushed in case of bursting with the fluid through the pressure discharge line 7. The exiting solid, liquid or gaseous waste products are passed on to recovery or cleaning facilities, which are connected to the pressure discharge line 7 or several pressure discharge lines 7 of a plurality of bursting inserts in a pipeline or apparatus system, where they are then removed from the fluid.

The present invention will be employed in case of bursting where a bursting disc has to be replaced. According to the invention the bursting insert 1 is removed from the pipeline system without the need for making changes on the pipeline system 29 or the two pipeline members 16a, 16b adjoining the bursting insert. To this end either the whole bursting insert 1 may be removed from the pipeline system 29 as a pipe section fully surrounding the passage volume, as in the embodiments of FIGS. 1 and 2, or however part of the wall defining the passage volume 2, as in the embodiment of FIGS. 4 and 5.

The bursting body 8 may be provided from the inside on the inner surface 6 of the wall 5 due to the simple removability of the bursting insert 1. This permits a particularly stable supporting and centering of the bursting body 8 and the predetermined bursting pressure can be observed accurately. Moreover, in the removed state of the bursting insert 1 the passage volume 2 of the pipeline system 29 can be inspected easily because the wall surrounding the pressure discharge line 7 is also disassembled, resulting in a large access opening.

What is claimed is:

1. A bursting insert for installation in a fluid transporting pipeline or apparatus comprising a wall which at least partially surrounds a passage volume through which fluid flows in a passage direction, the bursting insert comprising a pressure discharge line extending from the passage volume, and a bursting body which seals the pressure discharge line relative to the passage volume and which, when a predetermined bursting pressure is exceeded, is transferable to a state in which the passage volume and the pressure discharge line are interconnected in fluid-conducting relationship, wherein the bursting insert is configured as a pipeline module adapted for repeated installation and removal with respect to the pipeline or apparatus permitting replacement of the bursting body, and wherein the bursting body is mounted from an inside location of the wall.

2. The bursting insert according to claim 1, wherein the pressure discharge line is defined at least in part as an opening in the wall.

3. The bursting insert according to claim 1, wherein the bursting body is mounted in an area of the wall surrounding the pressure discharge line.

4. The bursting insert according to claim 1, wherein the bursting body is larger than a flow cross-section of the pressure discharge line.

5. The bursting insert according to claim 1, wherein the bursting body and the wall are located at substantially the same distance from a center of the passage volume.

6. The bursting insert according to claim 1, wherein the bursting body forms part of the wall.

7. The bursting insert according to claim 1, wherein the bursting body is detachably mounted on an inner surface of the wall.

8. The bursting insert according to claim 1, wherein the bursting body is substantially disc shaped.

9. The bursting insert according to claim 8, wherein the bursting body is curved in the passage direction.

10. The bursting insert according to claim 8, wherein the bursting body has a cross-section generally shaped as a spherical cap.

11. The bursting insert according to claim 8, wherein the bursting body curves into the pressure discharge line.

12. The bursting insert according to claim 1, further comprising a central body located in a central area of the passage volume and by which center flow of the fluid is replaced.

13. The bursting insert according to claim 12, wherein the fluid is a first fluid, and wherein the central body comprises a fluid line through which a second fluid separated from the first fluid can be passed.

14. The bursting insert according to claim 1, wherein the bursting insert has a length in the passage direction, and wherein the length of the bursting insert is not more than three times a diameter of the bursting body or the pressure discharge line.

15. The bursting insert according to claim 1, wherein the bursting insert is dividable in a plane extending in a direction transverse to the passage direction.

16. The bursting insert according to claim 1, wherein the bursting insert comprises a pipe section adapted to surround part of the passage volume of a pipeline member and which can be mounted on the pipeline member in a direction transverse to the passage direction.

17. The bursting insert according to claim 1, wherein the wall has a portion in an area of the pressure discharge line, and wherein the portion of the wall forms an attachment projecting into the passage volume and on which the bursting body is mounted.

18. The bursting insert according to claim 1, wherein the passage volume has a flow cross-section, and wherein the flow cross-section is reduced in an area of the bursting body.

19. A bursting insert for installation in a fluid transporting pipeline or apparatus comprising a wall which at least partially surrounds a passage volume through which fluid flows in a passage direction, the bursting insert comprising a pressure discharge line extending from the passage volume, and a bursting body which seals the pressure discharge line relative to the passage volume and which, when a predetermined bursting pressure is exceeded, is transferable to a state in which the passage volume and the pressure discharge line are interconnected in fluid-conducting relationship, wherein the bursting insert is configured as a pipeline module adapted for repeated installation and removal with respect to the pipeline or apparatus permitting replacement of the bursting body, and wherein the wall has a portion in an area of the pressure discharge line, and wherein the portion of the wall forms an attachment projecting into the passage volume and on which the bursting body is mounted.

20. The bursting insert according to claim 19, wherein the attachment has a substantially planar support surface for the bursting body.

21. The bursting insert according to claim 19, wherein the passage volume has a flow cross-section, and wherein the flow cross-section in an area of the bursting body is reduced continuously towards the attachment.

22. The bursting insert according to claim 19, wherein the passage volume has a flow cross-section, and wherein the flow cross-section is reduced in an area of the bursting body.

23. A bursting insert for installation in a fluid transporting pipeline or apparatus comprising a wall which at least partially surrounds a passage volume through which fluid flows in a passage direction, the bursting insert comprising a pressure discharge line extending from the passage volume, and a bursting body which seals the pressure discharge line relative to the passage volume and which, when a predetermined bursting pressure is exceeded, is transferable to a state in which the passage volume and the pressure discharge line are interconnected in fluid-conducting relationship, wherein the bursting insert is configured as a pipeline module adapted for repeated installation and removal with respect to the pipeline or apparatus permitting replacement of the bursting body, and wherein the passage volume has a flow cross-section, and wherein the flow cross-section is reduced in an area of the bursting body.

24. A modular fluid transporting system, comprising:
a pipeline having a wall which at least partially surrounds a passage volume through which fluid flows in a passage direction;
a bursting insert releasably coupled to the pipeline, the bursting insert comprising
a pressure discharge line extending from the passage volume; and
a bursting body which seals the pressure discharge line relative to the passage volume and which, when a predetermined bursting pressure is exceeded, is transferable to a state in which the passage volume and the pressure discharge line are interconnected in fluid-conducting relationship,
wherein the bursting insert is movable with respect to the pipeline to a position in which the bursting body is accessible for replacement by a user from an inside location of the wall.

25. The modular fluid transporting system according to claim 24, wherein the bursting insert has a passage volume, and wherein the passage volume of the pipeline and the passage volume of the bursting insert in an assembled state pass into one another essentially smoothly.

26. The modular fluid transporting system according to claim 24, wherein the pipeline is provided with a central body.

27. The modular fluid transporting system according to claim 24, wherein the pipeline and the bursting insert are provided on their ends situated in the passage direction with correspondingly mating flanges.

28. The modular fluid transporting system according to claim 24, further comprising a cleaning device connected to the pressure discharge line, and by which waste products of an exothermic reaction of fluid passed through the pressure discharge line can be removed from the fluid.

* * * * *